United States Patent [19]

Pearson

[11] Patent Number: 5,276,712
[45] Date of Patent: Jan. 4, 1994

[54] METHOD AND APPARATUS FOR CLOCK RECOVERY IN DIGITAL COMMUNICATION SYSTEMS

[75] Inventor: Jonathan D. Pearson, Lynnfield, Mass.

[73] Assignee: Digital Equipment Corporation, Maynard, Mass.

[21] Appl. No.: 438,749

[22] Filed: Nov. 16, 1989

[51] Int. Cl.⁵ .............................................. H04L 7/02
[52] U.S. Cl. .................................. 375/110; 375/120; 307/518
[58] Field of Search ............... 375/120, 106, 110, 118, 375/4; 331/1; 328/72-74; 307/231, 518, 510

[56] References Cited

U.S. PATENT DOCUMENTS

| | | | |
|---|---|---|---|
| 3,246,243 | 4/1966 | Widl | 375/4 X |
| 3,462,702 | 8/1969 | McCormick | 375/120 X |
| 3,569,853 | 3/1971 | Wolejsza | 375/120 X |
| 3,739,277 | 6/1973 | Schneider et al. | 375/56 X |
| 3,992,581 | 11/1976 | Davis | 375/3 |
| 4,151,485 | 4/1979 | Lafratta | 331/1 A |
| 4,180,783 | 12/1979 | Khalifa | 331/2 |
| 4,216,544 | 8/1980 | Boleda et al. | 375/119 |
| 4,222,117 | 9/1980 | Bugg | 375/110 |
| 4,242,754 | 12/1980 | Depouilly et al. | 375/110 |
| 4,320,515 | 3/1982 | Burton, Jr. | 375/120 X |
| 4,339,824 | 7/1982 | Tanimoto | 375/110 |
| 4,389,622 | 6/1983 | Kackman | 375/120 X |
| 4,466,110 | 8/1984 | Kizaki et al. | 375/120 X |
| 4,575,860 | 3/1986 | Scordo | 375/110 |
| 4,607,296 | 8/1986 | Smidth | 375/120 X |
| 4,615,041 | 9/1986 | Koskinen | 375/114 |
| 4,667,333 | 5/1987 | Butcher | 375/106 |
| 4,737,970 | 4/1988 | Viola et al. | 375/106 X |

FOREIGN PATENT DOCUMENTS 0021132 7/1981 European Pat. Off. .
0306993 11/1989 European Pat. Off. .

OTHER PUBLICATIONS

"The Radio Amateur's Handbook", fifth-ninth edition, American Radio Relay League, Newington; 1982, pp. 2-33-2-36, Tk 6550 R. 162.
Co, R. S. et al., "A Differential PLL Architecture For High Speed Data Recovery", IEEE 1989 Custom Integrated Circuits Conference, May 15-18, 1989, pp. 7.2.1-7.2.4.
Hadley, Les, "PLL Techniques For Clock Recovery From High Speed Data", ICCE 1986 Digest of Technical Papers, Jun. 3-6, 1986, pp. 296-297.

Primary Examiner—Curtis Kuntz
Assistant Examiner—Tesfaldet Bocure
Attorney, Agent, or Firm—Cesari and McKenna

[57] ABSTRACT

A technique for recovering a clock from a digitally encoded communication signal uses a low-Q resonator and limiter for generating a coarse clock signal comprising a series of rectangular pulses at a frequency substantially equal to the clock (though subject to phase jitter), and a filter circuit, such as a phase-locked-loop ("PLL"), preferably employing a Sequential Phase/Frequency Detector, to reduce the jitter superimposed on the coarse clock signal, so as to yield a well-behaved clock signal. By using a Sequential Phase/Frequency Detector, acquisition-aid circuitry generally is not required for the PLL.

4 Claims, 4 Drawing Sheets

METHOD AND APPARATUS FOR CLOCK RECOVERY IN DIGITAL COMMUNICATION SYSTEMS

FIELD OF THE INVENTION

The invention relates to a system for extracting a timing signal from a digitally encoded communication signal, i.e., to a system for clock recovery.

BACKGROUND OF THE INVENTION

In conventional digital communication systems, information is transferred between sending and receiving terminals over a transmission line or, more generally, a communication channel in a format suitable for that channel. The format can be a baseband signal or, using a digitally modulated carrier, a bandpass signal. In either case, the signal is characterized by a fundamental bit rate, i.e., the clock frequency of the data.

In synchronous transmission typically used in computer-to-computer communication, for example, the receiving terminal determines the clock frequency of the sending terminal, e.g., for decoding purposes, by deriving a clock signal from timing information inherent in the communication signal, itself. This process is known as clock recovery. The recovered clock enables the receiving terminal to optimally sample the received digitally encoded communication signals during the decoding process. Clock recovery circuits commonly are employed, for instance, in conjunction with local area networks ("LAN's") and point-to-point communication links.

In such applications, the baseband signals typically are encoded in a unipolar return-to-zero ("unipolar RZ"), bipolar return-to-zero ("bipolar RZ"), non-return-to-zero ("NRZ") or other largely standardized format or waveform. The unipolar-RZ, bipolar-RZ and NRZ designations are well understood by those skilled in the data transmission art.

"Unipolar RZ" format is a digital code form having two information states, termed LOGIC ZERO and LOGIC ONE, and is characterized by the signal returning to LOGIC ZERO during each bit interval or window in which a LOGIC ONE is represented. Thus, in effect, LOGIC ZERO is the neutral condition or state. In other words, each positively directed transition or excursion from the neutral condition in unipolar-RZ-formatted signals indicates a LOGIC ONE, the signal returns to the neutral condition after each such positively directed transition and within the same bit interval, and the absence of a transition during a bit interval indicates LOGIC ZERO. Thus, each bit interval can contain a pulse representing a LOGIC ONE, or no pulse which indicates a LOGIC ZERO. In unipolar RZ-encoded communication signals, the frequency spectrum of the transmitted data includes a spectral component at the clock frequency (i.e., at the fundamental bit rate of the data).

"Bipolar RZ" is a digital code form having three states. For example, a known version has a positive state and a negative state which both represent LOGIC ONE's, and an intermediate state therebetween which represents a LOGIC ZERO and is the neutral condition. In other words, each positively or negatively directed transition in a bit interval indicates a LOGIC ONE, and within each such bit interval, after either the positively directed or negatively directed transition, the signal returns to the neutral condition. Put still another way, each bit interval in which a LOGIC ONE is represented has either a positive pulse or negative pulse extending from the neutral condition, and the signal is at the neutral condition at the boundaries of each such bit interval. In bipolar RZ-encoded communication signals, after full-wave rectification, the frequency spectrum of the received data includes a spectral component at the clock frequency (i.e., at the fundamental bit rate of the data).

"NRZ format" is a digital code form having only two states, termed LOGIC ZERO and LOGIC ONE. In a known version of NRZ-formatted signals, the voltage jumps positive, i.e., has a positively directly transition, to indicate LOGIC ONE and remains in that state during the entire bit interval as well as for all subsequent, contiguous bit intervals, if any, having a LOGIC ONE value; jumps negative, i.e., has a negatively directed transition, to indicate LOGIC ZERO and remains in that state during the entire bit interval as well as for all subsequent, contiguous bit intervals, if any, having a LOGIC ZERO value; and only jumps at the bit-interval-boundaries between LOGIC ONE and LOGIC ZERO, and vice versa, when the value correspondingly changes state. The value changes state at the positively and negatively directed transitions, which are collectively referred to as "signal crossings" or simply "transitions'. An NRZ-encoded communication signal contains no actual spectral component at the clock frequency. The applicable clock frequency nonetheless can be derived from an NRZ-encoded signal by suitable clock recovery circuitry.

Clock recovery circuitry is responsible for deriving a clock signal equal in frequency to the bit rate of the transmitted message signal; or, phrased appropriately for unipolar- or full-wave rectified bipolar-RZ-formatted signals, clock recovery circuitry is responsible for recovery of the clock component contained or embedded in the received baseband signal, itself.

Conventional clock recovery circuits typically employ phase-locked loops ("PLL's"). A typical PLL has a voltage-controlled oscillator whose phase is locked onto a frequency component of its input signal. The PLL also has a phase detector for comparing the phase of the oscillator with the phase of the input signal, and for developing a voltage proportional to the phase differential, which commonly is referred to as a "phase error." This voltage is filtered and applied as a control voltage to the oscillator to adjust the oscillator's frequency. Due to negative feedback, the phase error is driven to a value which is preferably small, and the oscillator's frequency consequently is kept equal to the input frequency.

For various types of signal formats, the received signal is pre-processed before it is applied to the PLL for clock recovery. For bipolar RZ-formatted signals, for example, the received signals are first full-wave rectified before being applied to the PLL.

For NRZ-formatted signals, as another example, a transition detector circuit coupled in front of the PLL generates unipolar pulses at each signal crossing in the bit stream of the received signal, each pulse being within the bit window of the corresponding signal crossing of the received signal. In other words, the transition detector circuit generates a pulse corresponding to, and within the same bit interval as, each LOGIC-ZERO-to-LOGIC-ONE excursion (i.e., 0/1 transition) and each LOGIC-ONE-to-LOGIC-ZERO excursion (i.e., 1/0 transition). The output of the transition detector is a sequence of unipolar pulses, typically with gaps of varying lengths in between corresponding to bits in contiguous bit intervals having the same digital value. This output contains a clock frequency component. The PLL then generates a clock signal synchronized to this component.

PLL's used for clock recovery suffer a drawback of having a narrow pull-in range, i.e., such devices lock onto their input signals to derive a clock therefrom only when the input signals' bit rates fall within a narrow range centered about the clock frequency. For reliable operation, conventional recovery circuits using such PLL's typically must employ acquisition-aid circuitry. Acquisition-aid circuitry enables the PLL to reliably lock to the clock signal. Unfortunately, such acquisition aid circuitry can represent as much as half of the circuitry needed for clock recovery, and thus is costly in terms of circuit implementation, e.g., on I.C. chips in which space is typically at a premium. Additionally, the proper design and implementation of acquisition-aid circuitry can be costly in terms of engineering time and effort.

Another drawback of using a stand-alone PLL with acquisition-aid circuitry, as in the prior art, for recovering a clock is that the resulting clock signal is subject to systematic jitter which can reach undesirable levels, e.g., in cascaded clock recovery implementations.

Systematic jitter is undesired phase variations introduced within the PLL, and caused by fluctuations in the gain (typically expressed as volts/radian) of the phase detector. The phase detector gain varies as a function of transition density of the incoming bit stream for NRZ-formatted signals or of the LOGIC ONE density for unipolar or rectified bipolar RZ signals, and the densities vary in the short-term (i.e., over a time period on the order of the time constants of the PLL) due to the fact that the PLL input often does not contain a transition at the boundary of, or within, every bit interval. (For example, in NRZ-formatted signals, no transition occurs between contiguous LOGIC ZERO's or between contiguous LOGIC ONE's. Similarly, there is no transition or pulse in unipolar-RZ-formatted signals in bit intervals having a LOGIC ZERO value.) Thus, systematic jitter experienced in the prior art PLL-based clock recovery circuits is a result of the inherent characteristics of the encoded input signals to the PLL from which the clocks are to be recovered.

Examples of clock recovery circuits using PLL's are disclosed in U.S. Pat. Nos. 4,151,485, 4,180,783, 4,216,544, 4,575,860.

Another known type of clock recovery uses ringing circuits instead of PLL's. Ringing circuits for this purpose typically are configured for filtering, usually with a high Q-value, of either (i) the output of a transition detection circuit used for pre-processing NRZ-formatted signals, (ii) the full-wave rectified bipolar RZ-formatted signal, or (iii) directly of unipolar-RZ-formatted signals, themselves, to recover the clock signals. Unfortunately, such techniques typically are susceptible to filter mistuning, drift of the filter response over temperature, misalignments due to repeated temperature cycling, drift of the bit rate of the received data, and other problems, resulting in a discrepancy between the clock frequency and the center frequency of the ringing circuit. These problems combine in varying degrees and ultimately manifest themselves in the form of clock jitter.

Examples of this latter type of clock recovery circuit using filtering are disclosed in U.S. Pat. Nos. 4,222,117, 4,242,754, 4,339,824, 4,615,041, and 4,737,970.

SUMMARY OF THE INVENTION

Briefly, the invention resides in an improved clock recovery technique using a low-Q resonator and limiter to recover a coarse clock signal subject to jitter, and filtering circuitry, preferably including a PLL, for reducing that jitter. This technique recovers a substantially well-behaved clock signal.

The resonator converts its input into a signal having pulses at a frequency substantially equal to the desired clock frequency being recovered, and having no missing pulses at that frequency, i.e., gaps in the pulse series, as does the input to the resonator. (For example, the gaps may be caused by contiguous bit intervals having the same value in NRZ signals, or having LOGIC ZERO values in unipolar or bipolar RZ signals.) The existing pulses in the input signal to the resonator each excites ringing that approximates successive pulses, which ringing need continue only until the next existing pulse in the signal. Consequently, there is a pulse, and only one pulse, in the resonator output corresponding in position in time to each pulse in the desired clock being recovered, although the pulses may be displaced with respect to the clock pulses due to jitter. This signal is the output signal from the resonator, and, for convenience, hereinafter is called the "clock-frequency signal."

The clock-frequency signal is applied to a limiter which produces, as its output, a series of rectangular pulses at a frequency substantially equal to the desired clock frequency, but again subject to zero-mean jitter. The limiter output hereinafter is called the "coarse clock signal" or the "estimated clock signal."

The coarse clock signal then is applied to filtering circuitry, preferably including the PLL wherein the zero-mean jitter is reduced. A preferred PLL has a specific type of phase detector called a Sequential Phase/Frequency Detector ("PFD"). Heretofore, this type of PLL has not been considered suitable for clock recovery applications due to its sensitivity to the aforementioned gaps in its input, which can result in the PLL loosing phase lock, therefore, generating an erroneous clock signal. This is not a problem in the improved clock recovery circuit in accordance with the invention since, as mentioned above, the resonator "fills in" missing pulses in the gaps in the signal. Consequently, Sequential PFD's can be used and their many advantages obtained, as described below.

Advantages of clock recovery in accordance with the invention are many-fold. Regardless of whether Sequential or Non-sequential Phase/Frequency Detectors are used, systematic phase jitter is reduced, since substantially-constant PFD gain is realized. An advantage achieved by employing Sequential Phase/Frequency Detectors is the elimination of the need for acquisition-aid circuitry since PLL's using such PFD's have broad pull-in ranges that are typically independent of PLL bandwidth and limited only by the frequency range or the tuning current/voltage range of the oscillator. In addition to desirable pull-in performance, PLL's using Sequential Phase/Frequency Detectors exhibit improved immunity from unstable false lock conditions, which results in improved system reliability. Such circuitry is also noteworthy for its relative simplicity in design and implementation.

The present invention finds utility whenever a clock signal is to be recovered, e.g., from NRZ- or unipolar- or bipolar-RZ-formatted signals transmitted and received over fiber-optic communication, wire communication, bandpass radio communication, computer/peripheral interfaces, or other channels in order to establish timing at the receiver. The present invention is particularly well-suited for applications that are susceptible or sensitive to systematic phase jitter. Systematic phase jitter becomes significant, for example, when it accumulates in cascaded clock recovery circuits such as are used in long distance digital communication using repeaters.

BRIEF DESCRIPTION OF THE DRAWINGS

The invention will be best understood by reference to the following detailed description taken in conjunction with the accompanying drawings, in which.

DESCRIPTION OF A PREFERRED EMBODIMENT

Figure 1:
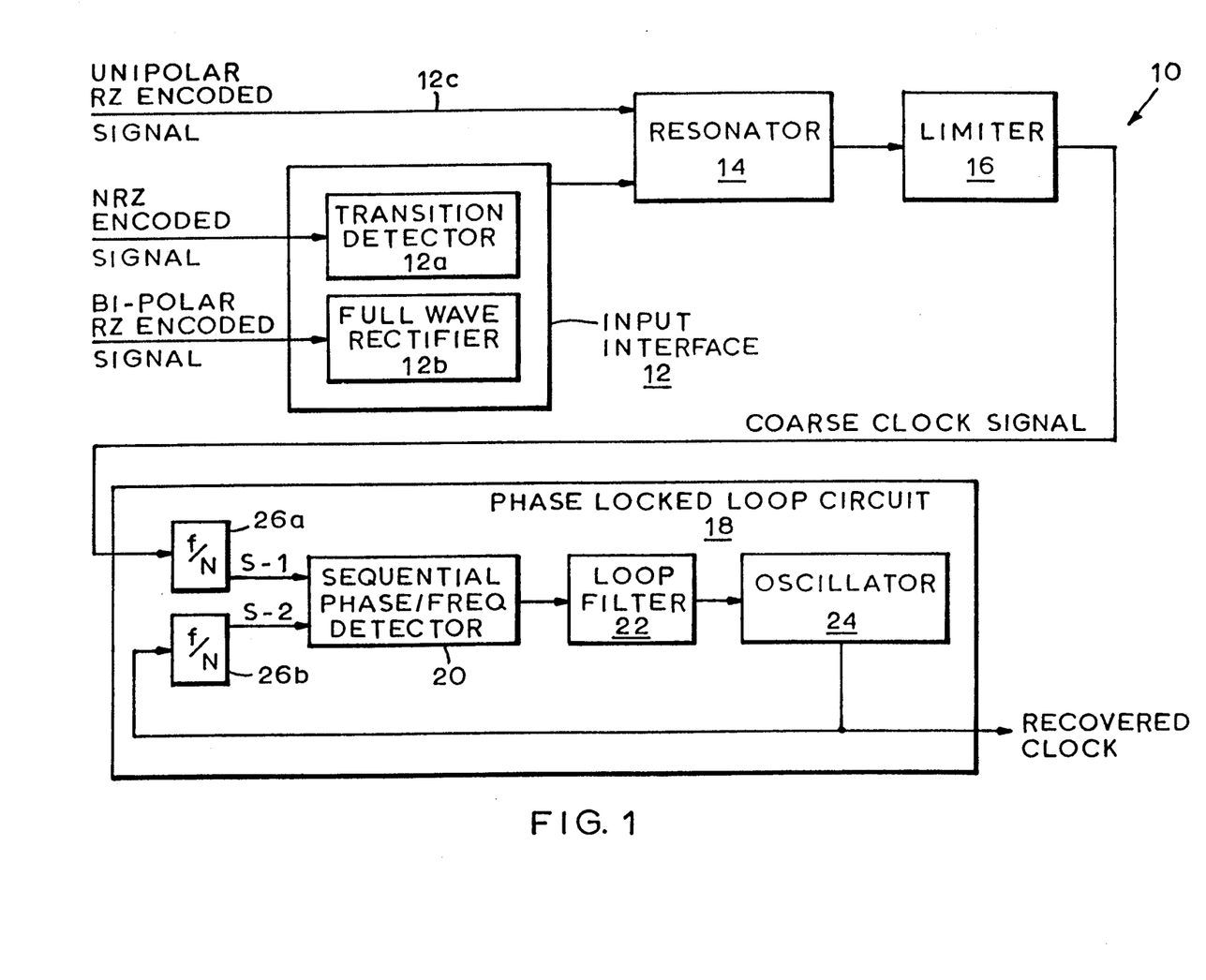
FIG. 1 is a block diagram of a clock recovery system in accordance with the invention.

Referring now to the drawings, a system 10 for recovering a clock from digital communication signals in accordance with the invention is shown in FIG. 1. The clock recovery system 10 includes an input interface 12 for pre-processing communication signals when in selected formats (such as NRZ and bipolar RZ); a resonator 14 for receiving the output of the interface 12 or, e.g., an unipolar RZ signal, itself, as its input signal and supplying pulses in those bit intervals which lack pulses, and thereby generating a sinusoidal signal having a frequency substantially equal to that of the clock; a limiter 16 for squaring-up this clock-frequency signal, i.e., converting the signal into a series of unipolar rectangular pulses while preserving its frequency, thereby recovering a coarse clock signal subject to jitter. The system 10 also has circuitry for filtering the coarse clock signal, including preferably a self-lock-acquiring, narrow-band phase-locked-loop circuit 18 for reducing the jitter superimposed on the coarse clock signal, thereby producing a well-behaved clock signal.

The input interface 12 preferably includes a transition detector 12a for pre-processing NRZ signals. The transition detector 12a receives the NRZ signal, which is typically corrupted by noise and distortion, and generates a pulse for every transition, whether 1/0 or 0/1, occurring in the received signal. The output of the transition detector 12a is a series of pulses with gaps, i.e., bit intervals having no pulses, which correspond to contiguous LOGIC ONES or LOGIC ZEROS in the NRZ data stream. The transition detector output contains a strong clock component in its spectrum.

Numerous different circuit designs for transition detectors are well known in the art. For example, transition detector 12a may be implemented in the form of a delay-line multiplier (e.g., a mixer having the communication signal as its first input and a delayed version thereof as its second input). Alternatively, it can be implemented in digital circuitry using an "EXCLUSIVE OR" gate in place of the mixer. In any case, optimal performance of the transition detector 12a is attained generally when the width of each pulse it generates is equal to one-half the NRZ bit time. This results in suppression of even harmonic energy in the output from the transition detector 12.

The input interface 12 preferably also includes a circuit 12b for full-wave rectifying bipolar RZ signals. On the other hand, unipolar RZ signals can be fed directly to the resonator 14, by-passing the input interface 12, as shown by line 12c.

The resonator 14 preferably is a low-Q bandpass filter, e.g., a single tuned L-C filter centered at the expected clock frequency. The response of the resonator 14 to each input pulse is an exponentially decaying sinusoid at the nominal clock frequency. These individual sinusoids are superimposed to produce a varying-amplitude sinusoidal output signal having a frequency substantially equal to that of the clock being recovered. A first plurality of the positive half-cycles of the sinusoidal signal correspond to actual pulses in the bit intervals of the input signal to the resonator 14, while a second plurality correspond to bit intervals in the input signal that lack pulses. Thus, the resonator 14 can be viewed as supplying the pulses that are missing from its input signal.

Because of the low Q-value of the resonator 14, the performance of the resonator 14 is substantially immune to small discrepancies between the clock frequency and the resonator center frequency. The Q-value of the resonator 14 preferably is selected to be low enough so that drift and misalignment of the center frequency with respect to the clock frequency will not present difficulties, while being high enough, preferably, just high enough, to keep the sinusoids in the output from the resonator 14 from decaying in amplitude below the input sensitivity level of the limiter 16 when one or more consecutive pulses are absent from the input signal.

As such, the Q-value is determined on the basis of the maximum expected duration between pulses, commonly known as "run length," of the pre-processed signal from the transition detector 12a or the maximum duration between LOGIC ONE's in unipolar or bipolar RZ signals, and so depends on the particulars of the particular communication application in which the invention is employed. Generally speaking, a Q-value of between ten and one hundred should be appropriate for clock recovery from typical digital communication signals used today. As a first approximation, the optimal Q-value has been found to be $\pi$ times the run length of the data. However, the optimal Q-value will vary as a function of the statistics of the data.

The clock-frequency signal generated by the resonator 14 is fed to a wave-shaping device, such as the limiter 16. A preferred implementation of the limiter 16 is a zero-crossing detector, e.g., an over-driven AC-coupled amplifier. The limiter 16 squares-up the sinusoids of the output from the resonator 14 so as to produce a better-shaped coarse clock signal of generally rectangular pulses. This signal typically contains jitter, but it does have a pulse for every bit interval, so its frequency is substantially equal to the average data rate of the communication signal received by the system 10 and is of substantially uniform amplitude capable of driving the PLL 18.

More specifically, the jitter corrupting the coarse clock signal from the limiter 16 is believed to be zero-mean jitter which, typically, is due mainly to the phase jitter present in the received communication signal.

However, the jitter also is due partly to the small, but typically unavoidable, mistuning of the resonator 14. Because the jitter is zero-mean, it can be heavily filtered in the PLL 18, and substantially averaged out, to produce a substantially well-behaved clock signal.

Since the PLL 18 operates on angle information alone, nothing is lost by squaring-up the clock-frequency signal in the limiter 16 prior to delivering it to the PLL 18. On the other hand, since the resonator/limiter combination can provide a coarse clock signal with no missing pulses, the PLL 18 advantageously can be a special form of phase-locked loop not heretofore used in clock recovery, one that employs a Sequential Phase/Frequency Detector ("PFD") 20. The invention, however, can also be practiced using other suitable types of phase detectors, though then acquisition-aid circuitry generally would be required since PLL's using phase detectors other than Sequential PFD's typically have narrow pull-in ranges.

In addition to the Sequential PFD 20, the PLL 18 includes a loop filter 22 (e.g., an active lag-lead filter), and a voltage- or current-controlled oscillator 24 (e.g., an L-C varactor-tuned resonant oscillator), both of generally conventional design for use in a PLL for clock recovery. (A better understanding of conventional phaselock techniques can be had by reference to the aptly named textbook *Phaselock Techniques*, by Floyd M. Gardner, published by John Wiley & Sons, 1979). The loop filter 22 produces a tuning voltage for the oscillator 24, and drives the oscillator 24 towards phase lock. The oscillator 24 locks onto the phase, and thus also the frequency, of the signal into the PLL 18.

As stated above, unlike the prior art in which PLL's, themselves, are used to actually recover the clock signals, system 10 uses the resonator 14 and limiter 16 for deriving a coarse clock signal having a stream of pulses substantially at the clock frequency, with no missing pulses. This latter attribute, the absence of missing pulses, not only permits the PLL 18 to be implemented with a Sequential PFD, but also results in reducing the systematic jitter that is typically generated within PLL's. Consequently, the PLL 18 serves to filter the coarse clock signal from the limiter 16 to reduce phase jitter superimposed thereon by means of a design which, itself, introduces less systematic jitter, so as to produce a substantially clean, well-behaved clock signal locked to the clock frequency of the communication signal received by the system 10.

The Sequential PFD 20 preferably is an n-state phase comparator, where "n" is an integer greater than or equal to (preferably, equal to) three. The term "sequential" imports that the device uses a clocked digital memory (e.g., flip-flops). The Sequential PFD 20 compares the phase of its two inputs, S-1 and S-2, and produces an output corresponding to the phase differential of the input signals S-1, S-2.

Due to recent developments in Gallium Arsenide technology, a Sequential PFD is commercially available in a single package and operates at input frequencies up to 1 GHz. (A suitable Sequential PFD for low speed frequency detection is the integrated circuit designated MC12040 and made by Motorola, and for high speed frequency detection is the integrated circuit designated 16G044 and made by GIGABIT LOGIC CO.)

Alternatively, such higher clock rates can be accommodated by employing digital frequency pre-scalers 26a, 26b in the PLL 18. Both the pre-scalers 26a, 26b are labeled f/N in the drawing, where "f" represents frequency, and "N" is an integer greater than or equal to one. (A pre-scaler with N=1 is tantamount to a direct connection.) Pre-scaler 26a is coupled between the limiter 16 and input S-1 of the PFD 20, while pre-scaler 26b is coupled in the feedback line of the loop itself, to input S-2 of the PFD 20.

Accordingly, in the implementation of the invention shown in FIG. 1, the output of the limiter 16 is fed to pre-scaler 26a for frequency division, thence to the sequential PFD 20 as input S-1. The output of the PFD 20 is applied to the loop filter 22 which, in turn, feeds its output to the oscillator 24. The output from the oscillator 24 is provided to the pre-scaler 26b, which delivers it in frequency-divided form as feedback to the Sequential PFD as its second input S-2. The output of the oscillator 24 is also the output of the PLL 18, i.e., the output of the oscillator 24 is the recovered clock signal.

Figure 2:
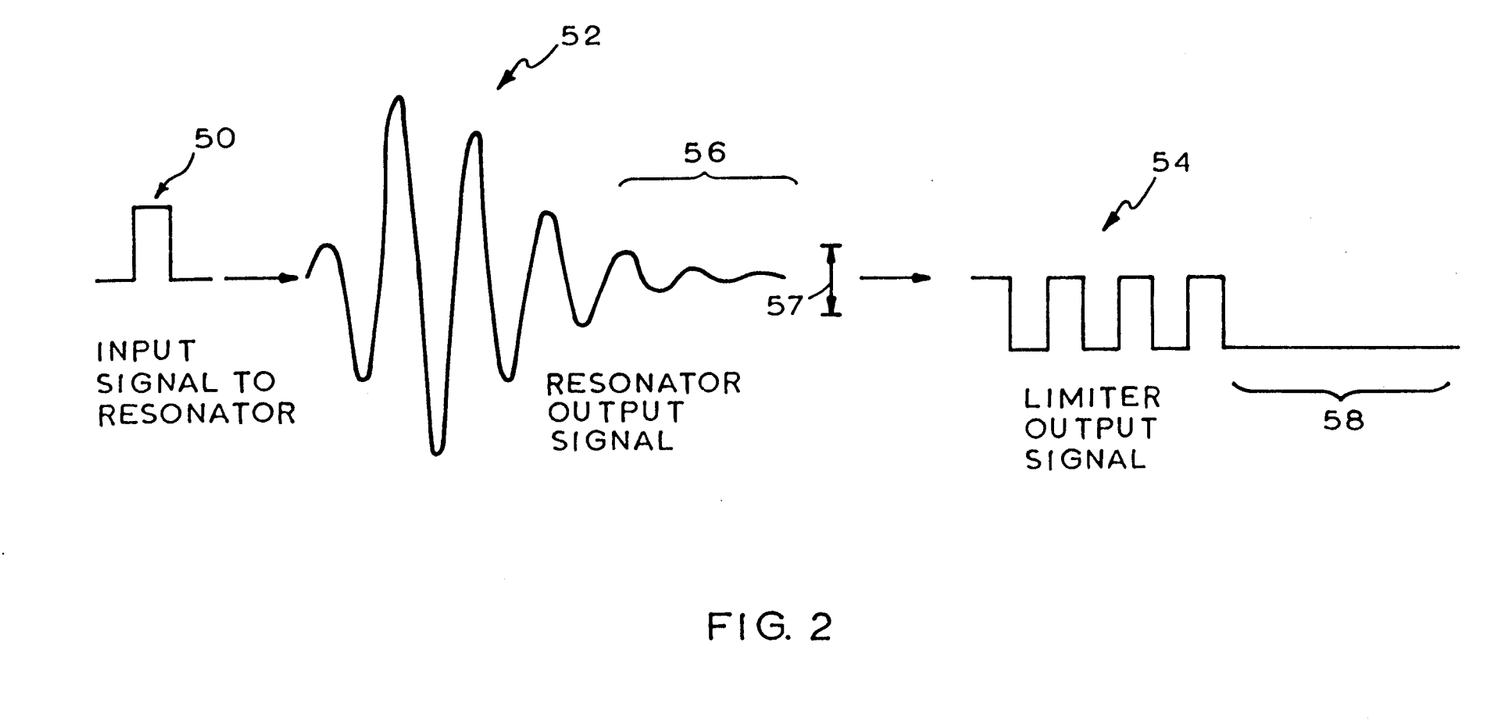
FIGS. 2 and 3 are signal diagrams for respective single pulse and NRZ-encoded bit stream inputs into the clock recovery system of FIG. 1.
Figure 3:
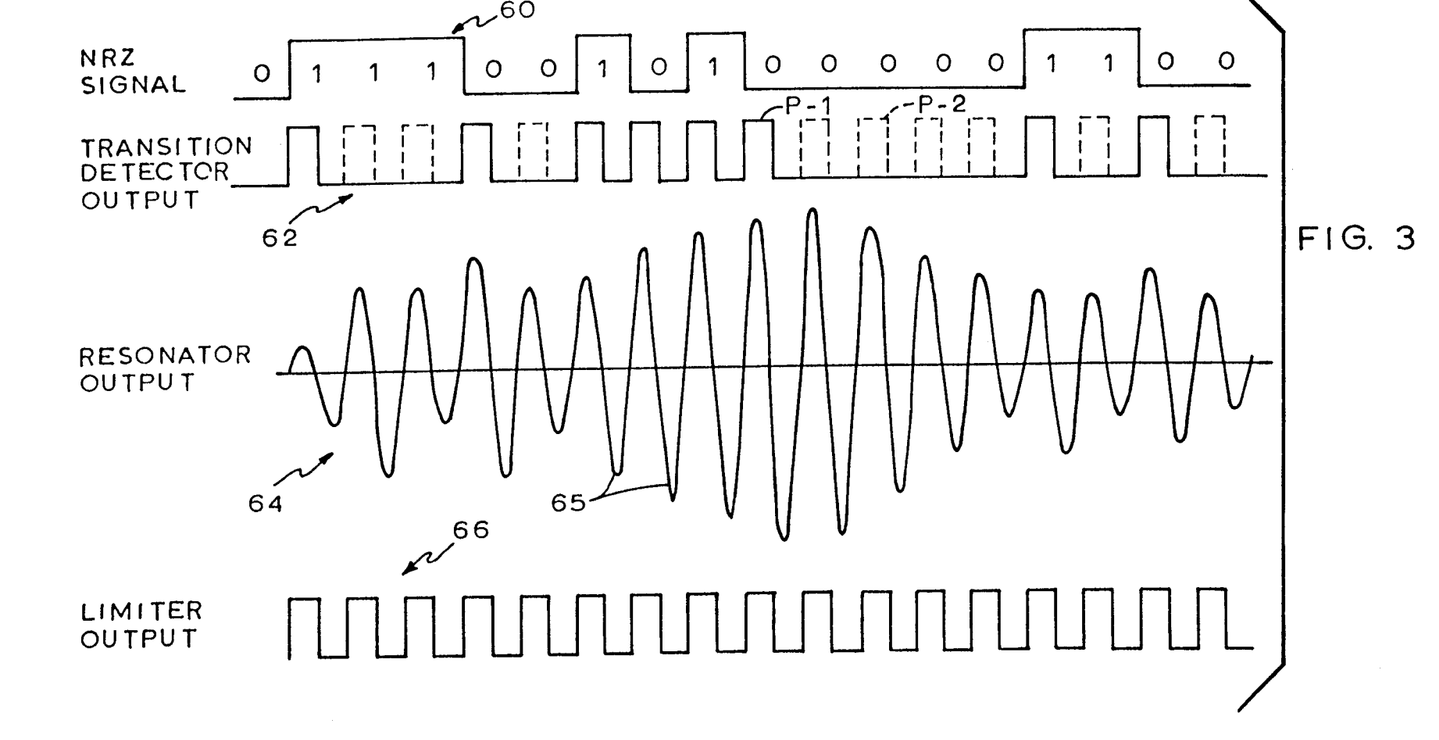

A further understanding of the operation of system 10 can be had from FIGS. 2 and 3. FIG. 2 is a signal diagram illustrating an idealized situation in which a single, rectangular pulse 50 is introduced as the input to the resonator 14. It should be understood that, in reality, a series of pulses would normally be received by the resonator 14, and that this FIG. 2 is incorporated herein for didactic purposes in order to help visualize the operation of the system 10.

The pulse 50 can represent a single pulse of the output of the input interface 12 (for an NRZ- or bipolar-RZ-encoded input to the system 10) or of an unipolar-RZ-encoded signal transmitted to the resonator 14 directly. Pulse 50 is processed by the resonator 14 so as to generate a resonator output signal 52 which, as indicated above and graphically shown in this FIG. 2, is a sinusoidal waveform due to the ringing of the resonator 14 that decays exponentially as a function of the Q-value of the resonator 14. Signal 52 is provided then to the limiter 16, which consequently generates the limiter output signal 54. It should be noted that, for that portion 56 of the resonator output signal 52 having an amplitude below a specific amplitude threshold, indicated by arrow 57 and corresponding to the limiter input sensitivity level, the corresponding portion 58 of the limiter output signal 54 has a substantially zero amplitude.

FIG. 3 is a signal and timing diagram in which the communication signal received by system 10 is an NRZ-encoded data signal 60 in the form of a bit stream. As before, the signals of FIG. 3 are idealized, this time since they are shown without the jitter and distortion that one would normally expect in real-life applications of the invention.

As shown, the NRZ-encoded data signal 60 is a stream of LOGIC ONE's and LOGIC ZERO's, though the illustrated sequence thereof,

011100101000001100 is only for illustrative purposes. As with any such NRZ-encoded signal, and as explained earlier, LOGIC ONE corresponds to a high amplitude within the corresponding bit interval and a LOGIC ZERO corresponds to a low amplitude within the corresponding bit interval, and there are no transitions between contiguous LOGIC ONE'S and between contiguous LOGIC ZERO's.

When signal 60 is processed by the transition detector 12a, signal 62 results as its output. As can be seen, transition detector output signal 62 is in the form of a series of non-uniformly spaced pulses P-1, each resulting from a transition in the communication signal 60. Hypothetically speaking, the signal 62 would be effectively a clock signal except for missing pulses, shown in phantom at P-2. The missing pulses P-2 keep the signal 62 from having the uniformly-spaced timing pulses as is required of a clock signal.

The transition detector output signal 62 is fed to the resonator 14, which converts it into a varying-amplitude sinusoidal signal 64 in which the missing pulses P-2 have been filled-in, as explained above in conjunction with FIG. 1. As a result, the resonator output signal 64 has a pulse 65, albeit not a rectangular pulse and not of uniform amplitude, for each data interval (whether LOGIC ONE or LOGIC ZERO in the original bit stream of the communication signal 60). The resonator output signal 64 clearly has substantially uniformly spaced pulses 65 (subject in actuality to phase jitter) at a frequency substantially equal to the clock, and for this reason is referred to herein as the clock-frequency signal. The resonator output signal 64 effectively is a superposition of the responses represented in signal 52 of FIG. 2 to each transition detector output pulse P-1.

The resonator output signal 64 is supplied to the limiter 16. The resulting limiter output signal 66 also has no missing pulses so long as the resonator output signal 64 does not decay below the input sensitivity level of the limiter 16. Even though the limiter output signal 66 is still subject to phase jitter (not shown in FIG. 3), it is squared-up to logic levels compatible with the prescaler 26a for N greater than one, or to logic levels compatible with the PFD 20 for N=1. (The combination of the input interface 12, resonator 14 and limiter 16 can be regarded as an intermediate-signal generator whose output signal is the limiter output 66.) The limiter output signal 66 is then filtered by the PLL 18 to remove the superimposed phase jitter and produce a substantially well-behaved clock signal, which happens to look like the signal 66 since it is illustrated without superimposed jitter.

Thus, it can be appreciated that the invention advantageously uses the resonator 14 for assuring that there are no missing pulses, and thereby extracting a clock-frequency signal, which then is used by the limiter 16 for obtaining the coarse clock signal which likewise has no missing pulses. By avoiding missing pulses to which Sequential PFD's are sensitive enough to otherwise prevent their use, such Sequential PFD's can be used and, due to the broad pull-in range they permit, acquisition-aid circuitry is not needed. Also, by so-called filling-in missing pulses, systematic phase jitter is reduced. In other words, by achieving constant transition (NRZ signals) or LOGIC ONE (unipolar or bipolar RZ signals) densities at the 100% level ("missing pulse recovery"), substantially constant phase detector gain is achieved, and consequentially systematic jitter is reduced.

The reduction in systematic jitter is achieved regardless of whether the phase detector used in the system 10 is a Sequential PFD or another suitable type, though Sequential PFD's are preferred because of their better performance—i.e., with Sequential PFD's (i) pullin is fast and does not require acquisition-aid circuitry, (ii) reliability is high, and (iii) immunity to unstable false lock conditions is high.

As mentioned above, the invention can be practiced expeditiously in those applications in which systematic jitter accumulates in cascaded clock recovery circuits, as occurs in long distance digital communication using repeaters and conventional clock recovery techniques. Of course, the invention is susceptible of use in a great many other applications which can take advantage of the improvements achieved thereby in clock recovery.

Figure 4:
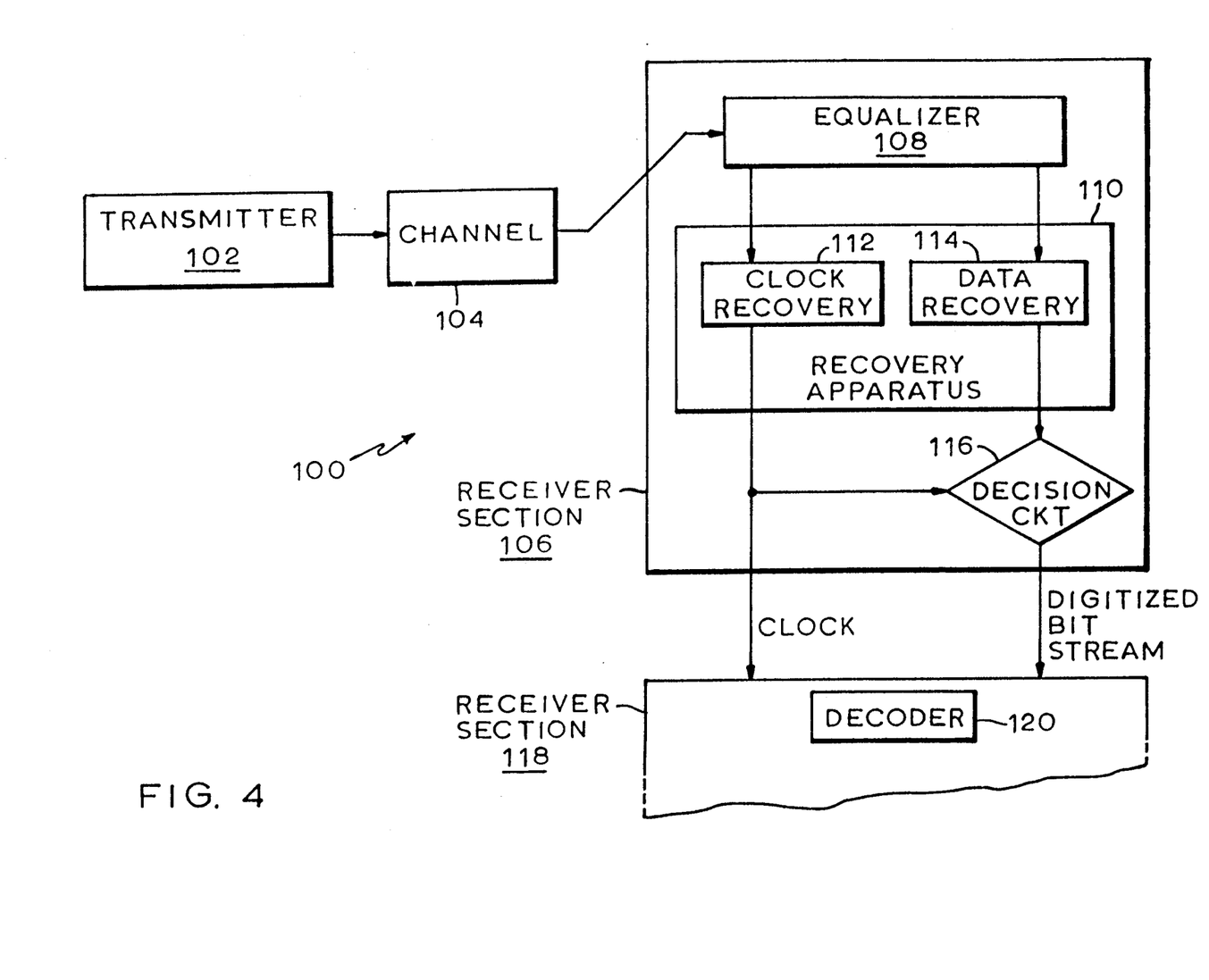
FIG. 4 is a block diagram of a digital communication system employing the clock recovery system of FIG. 1.

FIG. 4 shows a baseband communication system 100 in accordance with an illustrative practice of the invention. A sending terminal (or transmitter) 102 transmits a digitally encoded signal over communication channel 104 to a receiving terminal (or receiver) section 106. It should be appreciated that the invention is independent of the transmission medium.

Communication systems of the type shown and described herein commonly are employed in a wide range of applications (e.g., fiber-optic communication, coaxial wire communication, computer/peripheral interfaces) where baseband NRZ or unipolar RZ message signals are transmitted and received. In such applications, the received signal is inevitably corrupted to varying degrees by additive noise, intersymbol interference ("ISI"), and jitter. Normally, this corruption is not significant enough to seriously degrade the signal, but does place increased importance in obtaining an accurate, well-behaved, clean clock for decoding the signal.

In the receiver section 106, an equalizer 108 receives the transmitted signal and generally reduces inter-symbol interference ("ISI"), and otherwise processes this signal, so as to compensate for amplitude and phase distortion introduced in transmission. (An equalizer need not be employed in applications not plagued by high levels of such distortion, as is known by those skilled in the art.)

The processed signal is then fed to recovery apparatus 110, more particularly to both a clock recovery circuit 112, preferably of the type described in conjunction with FIG. 1, and to a conventional data recovery circuit 114. The recovered clock signal and this recovered data signal are provided to a decision circuit 116 for sampling the data at the appropriate clock rate based on the recovered clock signal, so as to convert the data signal into a bit stream having discrete DIGITAL ONE and DIGITAL ZERO levels. This bit stream and the recovered clock signal are then passed on to another receiver section 118 containing, for example, a decoder 120.

The invention has been described with reference to specific embodiments. Other embodiments will be apparent to those of ordinary skill in the art in light of this disclosure. For example, the input interface 12 can be omitted when the communication signals are encoded in unipolar-RZ format, or can contain only that circuitry needed for pre-processing the particular format of the communication signal when such pre-processing is required. Accordingly, it is not intended that this invention be limited except as indicated by the appended claims.

I claim:

1. Apparatus for recovering a clock signal from a digitally encoded data signal, said digitally encoded data signal representing a plurality of first and second digital states, each said digital state being defined within one of a plurality of bit intervals, a first plurality of said bit intervals having an associated transition between said first and second digital states, and a second plurality of bit intervals lacking an associated transition between said first and second digital states, said apparatus comprising:

A. pulse-supplying means for receiving said digitally encoded data signal and generating a coarse clock signal having a plurality of pulses each corresponding to one of said first plurality and second plurality of bit intervals, said pulses having a signal frequency substantially equal to the clock signal of the digitally encoded data signal, said pulse-supplying means having a resonator for generating, from said digitally encoded data signal, a sinusoidal signal having a frequency substantially equal to said clock signal to said digitally encoded data signal, and a limiter for receiving said sinusoidal signal and converting said sinusoidal signal to a coarse clock signal by producing a series of unipolar rectangular pulses having a frequency controlled by said resonator frequency;

B. a phase-locked loop circuit coupled to receive as an input said coarse clock signal from said pulse-supplying means for reducing phase jitter superimposed thereon, and producing an output signal in the form of a clock signal having a generally well-behaved clock signal recovered from the digitally encoded data signal, said phase-locked-loop circuit having an oscillator operating at an oscillator frequency controlled by an input signal, said oscillator capable of being controlled to operate at said signal frequency;

a sequential phase detector, operating at a detector frequency, said sequential phase detector having a first input and a second input, said sequential phase detector having an output comprising said oscillator input signal for controlling said oscillator to adjust said oscillator frequency;

a first digital frequency scaler, coupled between said limiter and said first input of said sequential phase detector, receiving said series of unipolar rectangular pulses, said first digital frequency scaler dividing said signal frequency of said series of unipolar rectangular pulses by a selected number greater than the number 1 giving said detector frequency;

and a second digital frequency scaler coupled between said oscillator and said second input of the sequential phase detector, said second digital frequency scaler dividing said oscillator output signal frequency by said selected number giving said detector frequency;

said sequential phase detector controlling said oscillator to adjust said oscillator frequency to match said signal frequency, and an output of said oscillator providing said clock signal.

2. The apparatus in accordance with claim 1, further comprising an input interface having means for receiving an NRZ signal comprising a transition detector, said transition detector producing a series of pulses, each of said pulses representing a transition at a boundary between a 1 bit and a 0 bit of said NRZ signal;

means for receiving a biopolar RZ signal comprising a full-wave rectifier, said full-wave rectifier producing a unipolar RZ signal;

means for receiving a unipolar RZ signal;

and means for supplying a selected one of said series of pulses from said transition detector, said bipolar RZ, and said unipolar RZ as said digitally encoded data signal to said pulse-supplying means.

3. An apparatus for reducing jitter in a coarse clock signal from a digitally encoded data signal comprising:

first means for providing a digitally encoded data signal having a pulse corresponding to each transition of said input signal through an input interface having a transition detector to process an NRZ signal and a full-wave rectifier to process a bipolar RZ signal;

means coupled to said first means for receiving said digitally encoded data signal, comprising a resonator producing a sinusoidal signal having a frequency substantially equal that of said digitally encoded data signal;

means for receiving said sinusoidal signal comprising a limiter and converting said sinusoidal signal to a series of unipolar rectangular pulses at a first input frequency to produce a coarse clock signal;

means for receiving said series of unipolar rectangular pulses comprising a phase-locked-loop, said phase-locked-loop having an oscillator and a sequential phase detector, sequential phase detector being associated with first and second scalers, one of said scalers disposed at each of two inputs thereof, said first scaler receiving said series of unipolar rectangular pulses and dividing said first input frequency thereof by a selected number greater than the number 1, said oscillator responsive to an output signal from said sequential phase detector to produce an output signal at a second input frequency, said second scaler dividing said second input frequency by a selected second number greater than the number 1, said divided frequencies from said first and second scalers controlling said sequential phase detector, said oscillator producing a clock signal with reduced jitter from said oscillator output signal.

4. An apparatus for reducing jitter in a coarse clock signal from a digitally encoded data signal comprising:

an input interface having means for receiving an NRZ signal, means for receiving a bipolar RZ signal, means for receiving a unipolar RZ signal, and means for supplying a selected one of said NRZ, bipolar RZ and unipolar RZ as said digitally encoded data signal;

a pulse-supplying means for receiving said digitally encoded data signal and generating a coarse clock signal, said pulse-supplying means having a resonator and a limiter;

and a phase-locked-loop circuit coupled to receive as an input said coarse signal from said pulse-supplying means and producing a generally well-behaved clock signal with reduced phase jitter.

* * * * *